(12) United States Patent
Koskela et al.

(10) Patent No.: US 9,374,190 B2
(45) Date of Patent: Jun. 21, 2016

(54) FLEXIBLE DATA FRAME DELIVERY

(71) Applicant: BROADCOM CORPORATION, Irvine, CA (US)

(72) Inventors: Timo Kalevi Koskela, Oulu (FI); Anna Pantelidou, Oulu (FI); Samuli Turtinen, Ii (FI); Sami-Jukka Hakola, Kempele (FI)

(73) Assignee: BROADCOM CORPORATION, Irvine, CA (US)

( * ) Notice: Subject to any disclaimer, the term of this patent is extended or adjusted under 35 U.S.C. 154(b) by 138 days.

(21) Appl. No.: 14/096,522

(22) Filed: Dec. 4, 2013

(65) Prior Publication Data
US 2014/0153512 A1    Jun. 5, 2014

(30) Foreign Application Priority Data

Dec. 4, 2012   (GB) .................................. 1221812.9

(51) Int. Cl.
H04L 1/00   (2006.01)
H04W 76/04   (2009.01)
H04L 1/18   (2006.01)

(52) U.S. Cl.
CPC ................ *H04L 1/00* (2013.01); *H04L 1/1854* (2013.01); *H04L 1/1887* (2013.01); *H04W 76/046* (2013.01)

(58) Field of Classification Search
CPC ....... H04L 1/00; H04L 1/1854; H04L 1/1887; H04L 47/30; H04W 76/046
USPC ......... 370/276, 277, 278, 310, 315, 316, 318, 370/328, 329, 338; 455/403, 422.1, 7, 11.1, 455/12.1, 13.4
See application file for complete search history.

(56) References Cited

U.S. PATENT DOCUMENTS

| 8,335,206 | B1 * | 12/2012 | Hirsch et al. ................... 370/350 |
| 2005/0047357 | A1 * | 3/2005 | Benveniste ................... 370/311 |
| 2005/0213534 | A1 | 9/2005 | Benveniste |

(Continued)

FOREIGN PATENT DOCUMENTS

GB   2 415 573 A   12/2005

OTHER PUBLICATIONS

UKIPO Combined Search and Examination Report mailed May 9, 2013 and issued in a related GB Application No. GB1221812.9 (6 pages).

*Primary Examiner* — Obaidul Huq
(74) *Attorney, Agent, or Firm* — Foley & Lardner LLP; Christopher J. McKenna; Paul M. H. Pua

(57) ABSTRACT

A method, apparatus and computer program product are provided for enhancing data exchange between an access point (AP) and station (STA) in a wireless network when the exchange must be interrupted for the AP to perform other services while data remains buffered for later exchange. AP downlinks an indicator that more data remains for exchange together with a request for the STA to enter sleep mode for a duration scheduled by the AP. Sleep duration may be sent in the medium access control (MAC) header of a data frame, with the indicator of more data and the indicator of the sleep mode request being contained in the frame control (FC) segment of the MAC header. The STA may uplink an acknowledgement (ACK) of the sleep mode. Alternatively, the AP may downlink an ACK of the STA's indication of more data confirmation together with sleep mode indication and duration.

17 Claims, 12 Drawing Sheets

(56) References Cited

U.S. PATENT DOCUMENTS

| | | |
|---|---|---|
| 2008/0095091 A1 | 4/2008 | Surineni et al. |
| 2008/0130543 A1* | 6/2008 | Singh et al. .................. 370/311 |
| 2013/0208637 A1* | 8/2013 | Abraham et al. ............. 370/311 |

* cited by examiner

FLEXIBLE DATA FRAME DELIVERY

CROSS REFERENCE TO RELATED APPLICATION

This application claims the benefit under 35 U.S.C. §119 (a) and 37 CFR §1.55 to UK Patent Application No. 1221812.9, filed on Dec. 4, 2012, the entire content of which is incorporated herein by reference.

FIELD OF THE INVENTION

The subject matter is data frame exchanges between access points and individual stations in a wireless communications network, and particularly managing data flow when stations are in low power mode when data is ready to be exchanged.

BACKGROUND INFORMATION

The access point (AP) should be able to support a large number of associated stations (STAs) (e.g. over 6000) which may operate on a very strict energy budget. Such devices could be battery powered sensors which transmit and receive data very rarely and stay in the low power operation mode for relatively long periods of time. The basic operation mode is the distributed coordination function (DCF) mode. In order to support a large number of STAs operating in random access mode the access point may utilize specific techniques to restrict contention to the channel to avoid of collisions of simultaneous transmissions. One such technique to reduce contention and collisions of transmission is a method of grouping STAs to multiple groups and assigning certain parameters for each group to indicate the specific group that can access content for the channel. Such grouping information and parameters for the operation can be delivered to the STAs in an association phase or in broadcast information such as beacons.

The STAs may operate in low power mode for prolonged periods of time and therefore the grouping related parameters may be not be valid anymore when a STA wakes up and resumes the channel access operation. Broadcast messages such as beacons are transmitted only occasionally and if a STA stays in low power mode for extended periods of time it may lose synchronization (due to the internal clock drift in the AP and in the STA) and is not able to estimate when the next beacon would be transmitted. This may cause the STA to stay awake for relatively long period trying to receive a beacon transmission.

In 802.11 protocol the AP buffers data frames if the STA is in the low power state. The AP informs the STAs about the buffered frames by indicating buffered data in the traffic indication map (TIM) which is transmitted in the beacon message. Once the STA awakes it can retrieve the buffered frames by transmitting some buffered uplink (UL) data which implicitly notifies the AP that the STA is awake, or the STA can transmit a power save poll (PS-poll) to indicate to the AP that it is awake and ready to receive data. Alternatively any frame that is classified to be a so called 'trigger frame' indicates that STA is awake.

To improve data exchange between AP and STAs, speed frame exchange can be initiated between AP and STA (or between STA and another STA). AP may have data in the DL buffer but is not able to transmit all the data in the same session since it may have some pending management frames in the buffer (such as a beacon transmission) or other control/data frames it may need to deliver.

SUMMARY OF THE INVENTION

In a first embodiment, a method is provided in which an access point (AP) sends by downlink signal an indication that data remains buffered for delivery after an interruption in data frame exchanges, schedules a target wake time at which to resume sending data frames, and sends a sleep mode indication and sleep duration to set the target wake time. The method includes setting a power management indicator to indicate a sleep mode request to a station (STA). Another aspect is receiving an uplink signal acknowledgement of the sleep mode indication and sleep duration data. In another embodiment, the indication of buffered data and sleep mode indication and duration are sent in a downlink acknowledgement frame. The method may continue by resuming data frame exchange after the scheduled target wake time, causing a downlink signal data frame to be sent that causes buffered data to be emptied, and including an indicator that no data remains to send. The power management indicator indicates an active state followed by receiving a data frame uplink with an indicator of no more data (MD) together with a sleep mode indicator. The method may conclude by causing a downlink acknowledgement of impending sleep mode to be sent.

Another aspect of the first embodiment is receiving by downlink signal an indication that data remains buffered for delivery after an interruption in data frame exchanges, and receiving a sleep mode indication together with sleep duration data to set a target wake time, wherein the downlink signal is an acknowledgement frame. The method of this embodiment may include causing an uplink signal acknowledgement of the sleep mode indication and sleep duration data to be sent. This aspect of the embodiment may also include causing an uplink data frame to be sent with an indication that data is buffered for reception after the interruption and that a sleep mode request has been received. The method may continue with the STA initiating sleep mode after sending the uplink acknowledgement or initiating sleep mode after receiving the acknowledgement frame downlink signal. This embodiment may include terminating sleep mode, receiving data frame exchange(s), and receiving a downlink data frame having an indicator of no more data. The method may further include causing an uplink data frame to be sent with a no more data indicator and having the sleep mode indicator set.

Another embodiment is an apparatus with a processor, a memory containing computer coded instructions that cause the apparatus to cause to be sent by downlink signal an indication that data remains buffered for delivery after an interruption in data frame exchanges, schedule a target wake time at which to resume sending data frames, and cause a sleep mode indication and sleep duration to be sent to set the target wake time. The apparatus may be caused to set a power management indicator to indicate a sleep mode request to a station (STA). Another aspect of the apparatus is receiving an uplink signal acknowledgement of the sleep mode indication and sleep duration data. In another embodiment, the indication of buffered data and sleep mode indication and duration are sent in a downlink acknowledgement frame. The apparatus may be caused to resume data frame exchange after the scheduled target wake time, cause a downlink signal data frame to be sent that empties buffered data, and include an indicator that no data remains to send. The power management indicator may indicate an active state followed by receiving a data frame uplink with an indicator of no more data together with a sleep mode indicator. The apparatus may also be caused to send a downlink acknowledgement of impending sleep mode.

Another aspect of an apparatus embodiment is an apparatus that is caused to receive by downlink signal an indication that data remains buffered for delivery after an interruption in data frame exchanges, and to receive a sleep mode indication together with sleep duration data to set a target wake time, wherein the downlink signal is an acknowledgement frame. The apparatus may be caused to send an uplink signal acknowledgement of the sleep mode indication and sleep duration data. This aspect of the embodiment includes the apparatus being caused to send an uplink data frame with an indication that data is buffered for reception after the interruption and that a sleep mode request has been received. The apparatus may be caused to continue with the STA initiating sleep mode after sending the uplink acknowledgement or initiating sleep mode after receiving the acknowledgement frame downlink signal. This embodiment includes the apparatus being caused to terminate sleep mode, receive data frame exchange(s), and receive a downlink data frame having an indicator of no more data. The apparatus may be further caused to send an uplink data frame with a no more data indicator and having the sleep mode indicator set.

In an alternative embodiment, a computer program product is described having computer coded instructions by which an access point (AP) causes by downlink signal an indication to be sent that data remains buffered for delivery after an interruption in data frame exchanges, schedules a target wake time at which to resume sending data frames, and causes a sleep mode indication and sleep duration to be sent to set the target wake time. The program product instructions may be configured to set a power management indicator to indicate a sleep mode request to a station (STA). Another aspect involves computer program instructions configured to receive an uplink signal acknowledgement of the sleep mode indication and sleep duration data. In another embodiment, program instructions are configured to cause the indication of buffered data and sleep mode indication and duration to be sent in a downlink acknowledgement frame. The program product instructions may also be configured to resume data frame exchange after the scheduled target wake time, cause a downlink signal data frame to be sent that causes buffered data to be sent, and include an indicator that no data remains to send. The power management indicator may indicate an active state followed by receiving a data frame uplink with an indicator of no more data together with a sleep mode indicator. The computer program instructions may be configured to cause a downlink acknowledgement of impending sleep mode to be sent.

Another aspect of the computer program product embodiment is computer instructions causing receiving by downlink signal an indication that data remains buffered for delivery after an interruption in data frame exchanges, and receiving a sleep mode indication together with sleep duration data to set a target wake time, wherein the downlink signal is an acknowledgement frame. The program product may include instructions for causing to be sent an uplink signal acknowledgement of the sleep mode indication and sleep duration data. This aspect of the embodiment may include instructions configured to cause an uplink data frame to be sent with an indication that data is buffered for reception after the interruption and that a sleep mode request has been received. The program product may continue with instructions for causing the STA to initiate sleep mode after sending the uplink acknowledgement or to initiate sleep mode after receiving the acknowledgement frame downlink signal. This embodiment may include instructions for terminating sleep mode, receiving data frame exchange(s), and receiving a downlink data frame having an indicator of no more data. The program product may further include instructions configured to cause an uplink data frame to be sent with a no more data indicator and having the sleep mode indicator set.

A further embodiment is an apparatus including means for causing by downlink signal an indication to be sent that data remains buffered for delivery after an interruption in data frame exchanges; means for scheduling a target wake time at which to resume sending data frames; and means for causing a sleep mode indication and sleep duration to be sent to set the target wake time. The apparatus may include means for setting a power management indicator to indicate a sleep mode request to a station (STA). Another aspect is means for receiving an uplink signal acknowledgement of the sleep mode indication and sleep duration data. In another embodiment, the indication of buffered data and sleep mode indication and duration are sent in a downlink acknowledgement frame. The apparatus may further include means for resuming data frame exchange after the scheduled target wake time, and means for causing a downlink signal data frame to be sent that causes buffered data to be emptied, and means for including an indicator that no data remains to send. The power management indicator indicates an active state followed by receiving a data frame uplink with an indicator of no more data together with a sleep mode indicator. The apparatus may also include means for causing a downlink acknowledgement of impending sleep mode to be sent.

Another aspect of this apparatus embodiment is means for receiving by downlink signal an indication that data remains buffered for delivery after an interruption in data frame exchanges, and means for receiving a sleep mode indication together with sleep duration data to set a target wake time, wherein the downlink signal is an acknowledgement frame. The apparatus may include means for causing an uplink signal acknowledgement to be sent of the sleep mode indication and sleep duration data. This aspect of the embodiment may include means for causing an uplink data frame to be sent with an indication that data is buffered for reception after the interruption and that a sleep mode request has been received. The apparatus may include means for the STA initiating sleep mode after sending the uplink acknowledgement or initiating sleep mode after receiving the acknowledgement frame downlink signal. This embodiment may include means for terminating sleep mode, means for receiving data frame exchange(s), and means for receiving a downlink data frame having an indicator of no more data. The apparatus may further include means for causing an uplink data frame to be sent with a no more data indicator and having the sleep mode indicator set.

In an alternative embodiment a method in which AP has no buffered DL data for the STA while STA is delivering uplink data to the AP, the AP may indicate STA to deliver rest of the buffered data by scheduling a target wake time in an acknowledgement. AP may indicate this by setting the power management indicator in the acknowledgement message as a response to the UL data. STA may or may not acknowledge the scheduling of target wake time.

BRIEF DESCRIPTION OF THE DRAWINGS

Figure 1:
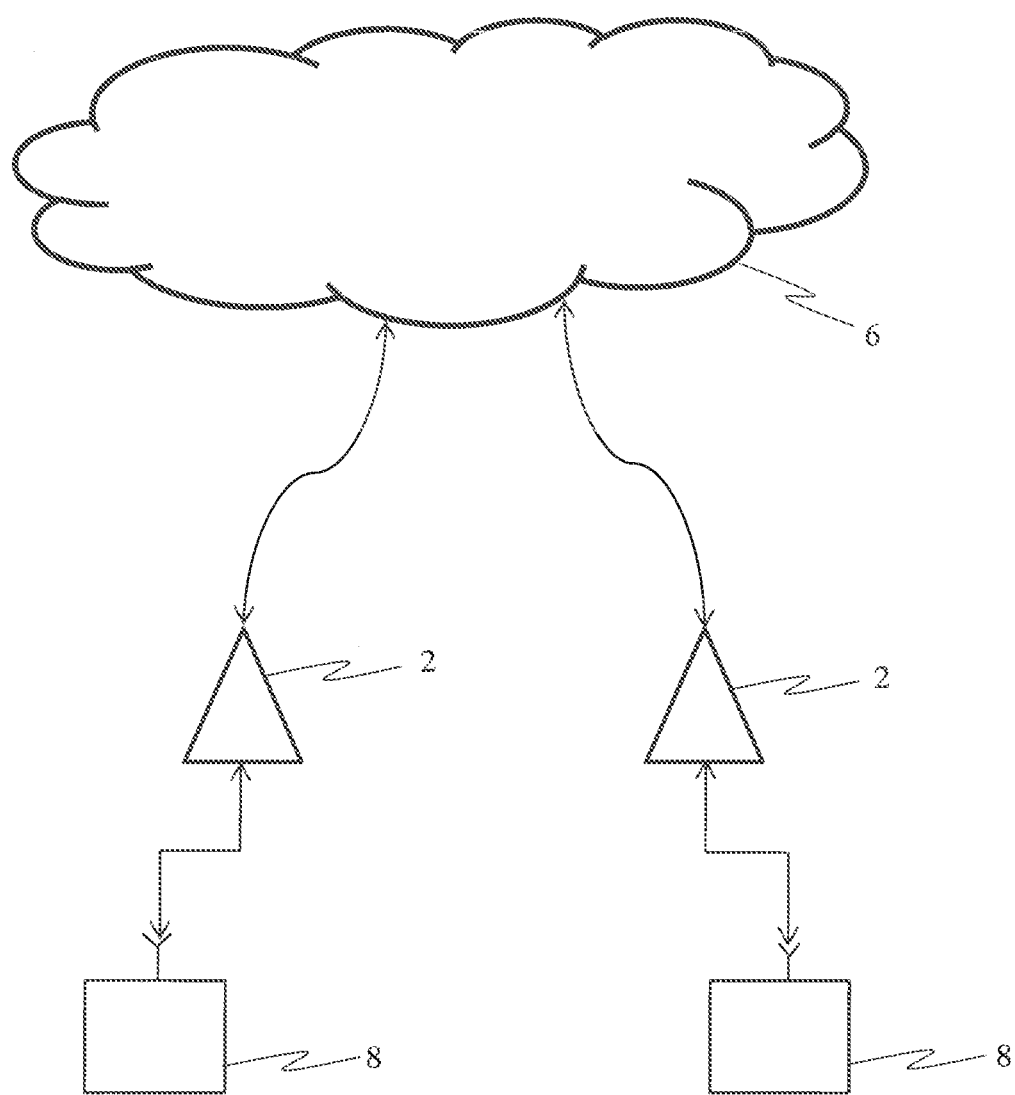

Having thus described certain embodiments of the invention in general terms, reference will now be made to the accompanying drawings, which are not necessarily drawn to scale, and wherein:

FIG. 1 is a schematic drawing of a generalized wireless communications network.

Figure 2:
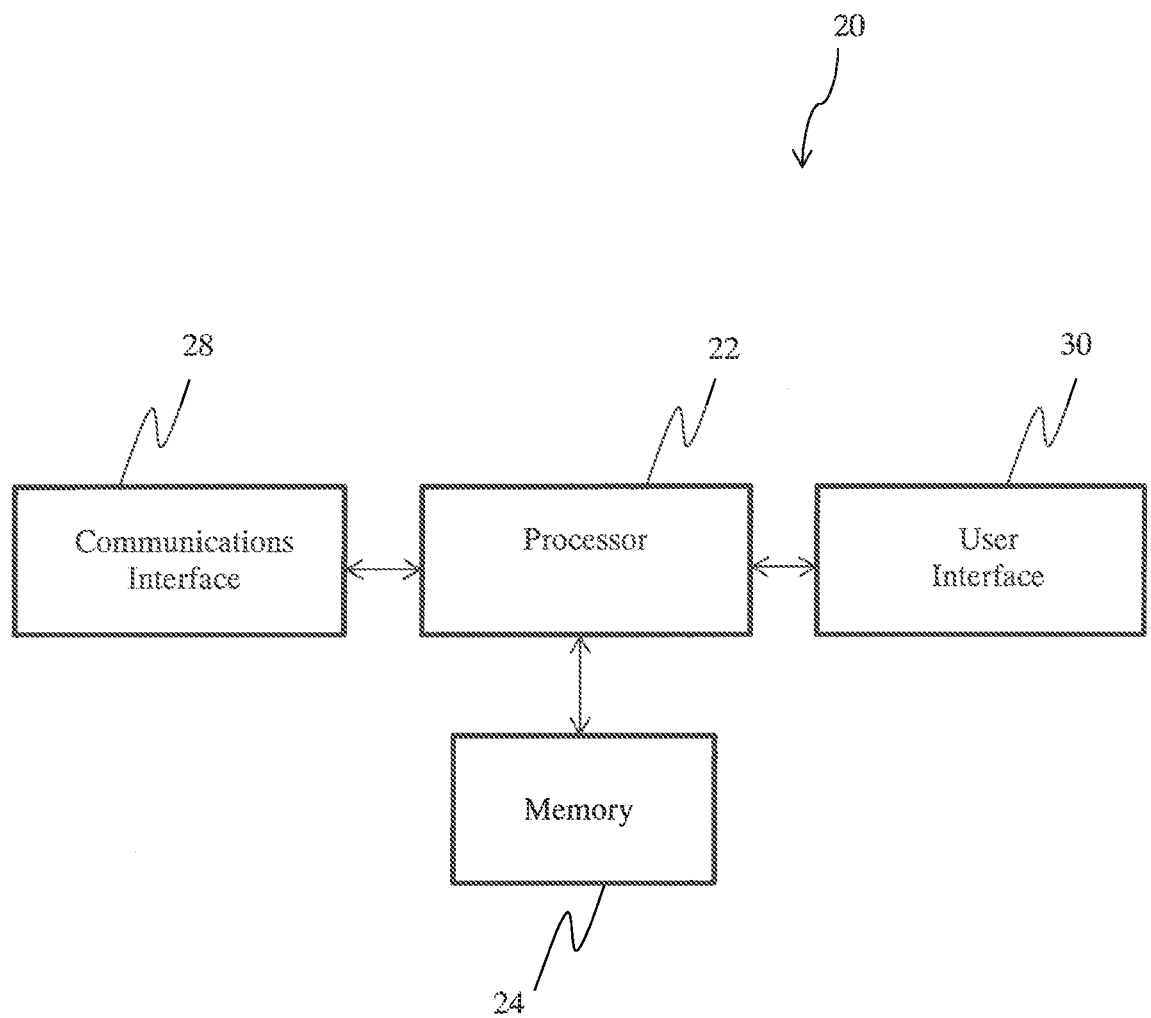

FIG. 2 is a schematic block drawing of an apparatus that may be embodied by a mobile terminal or an access point and may be specifically configured in accordance with an example embodiment of the present invention.

Figures 3A, 3B:
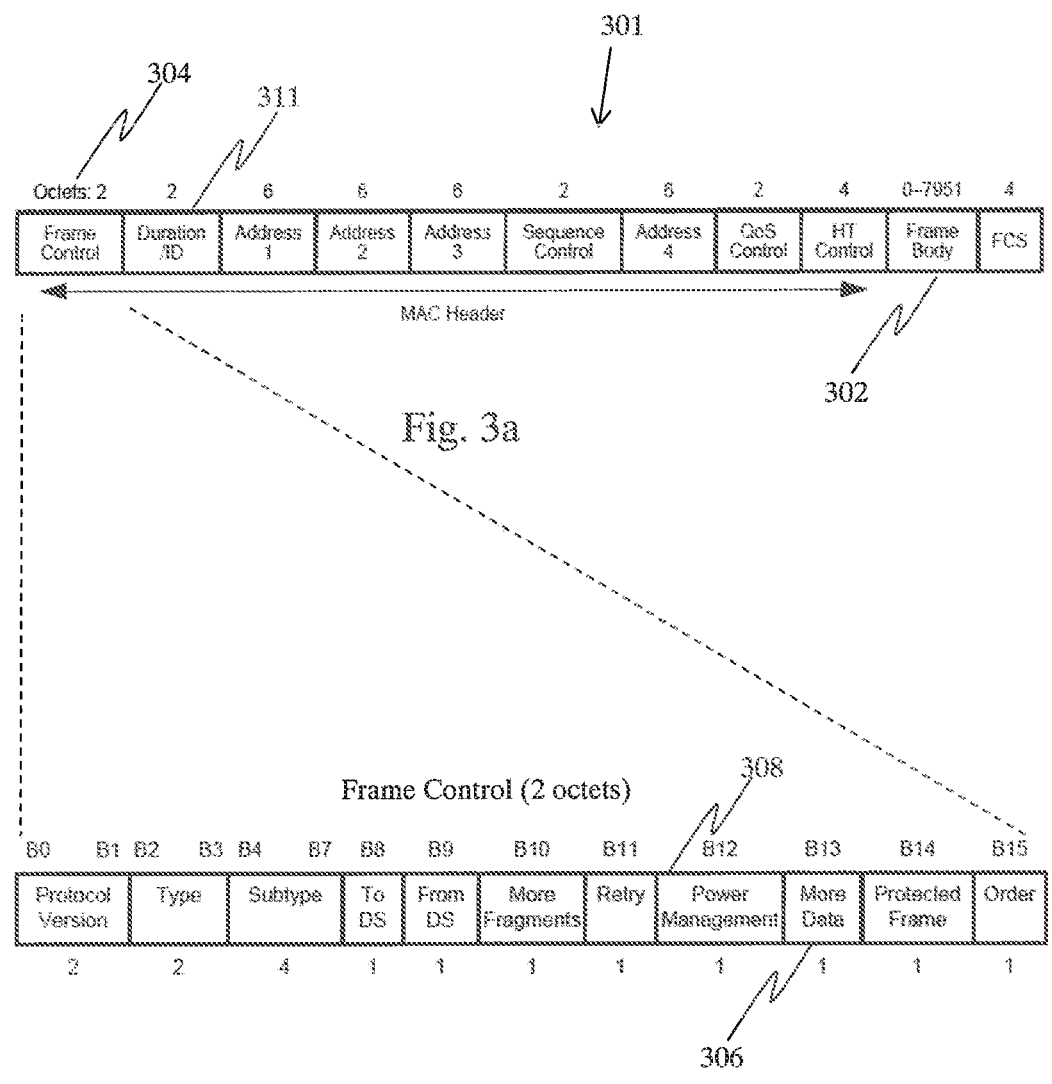

FIGS. 3a and 3b are schematic drawings of data bit allocations. FIG. 3a is a drawing of a data frame medium access control (MAC) header; FIG. 3b is an illustration of the Frame Control block in the MAC header.

Figure 4:
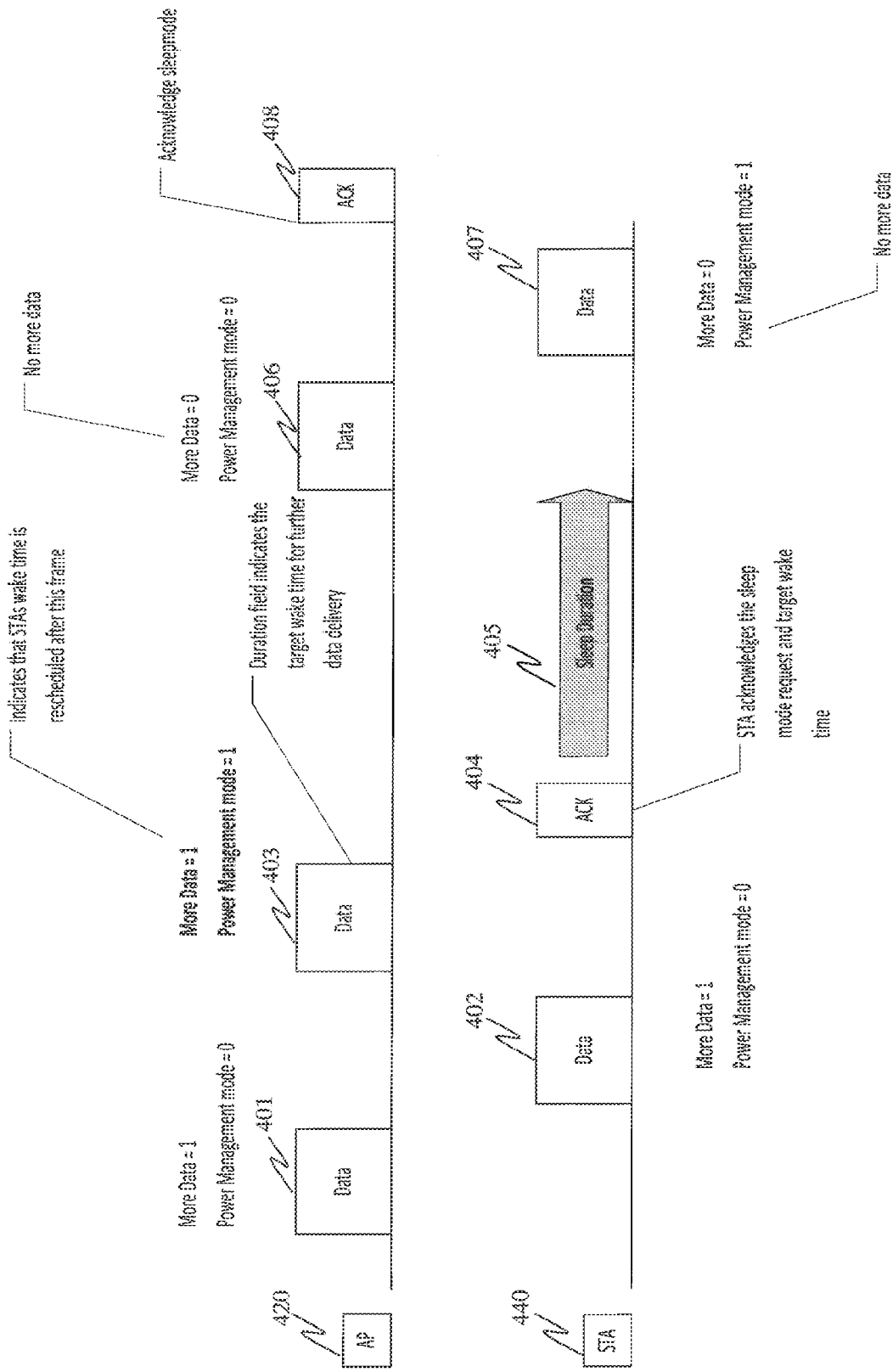

FIG. 4 is a schematic sequence diagram for one embodiment of data frame exchanges between an access point (AP) and station (STA) in a wireless network.

Figure 5:
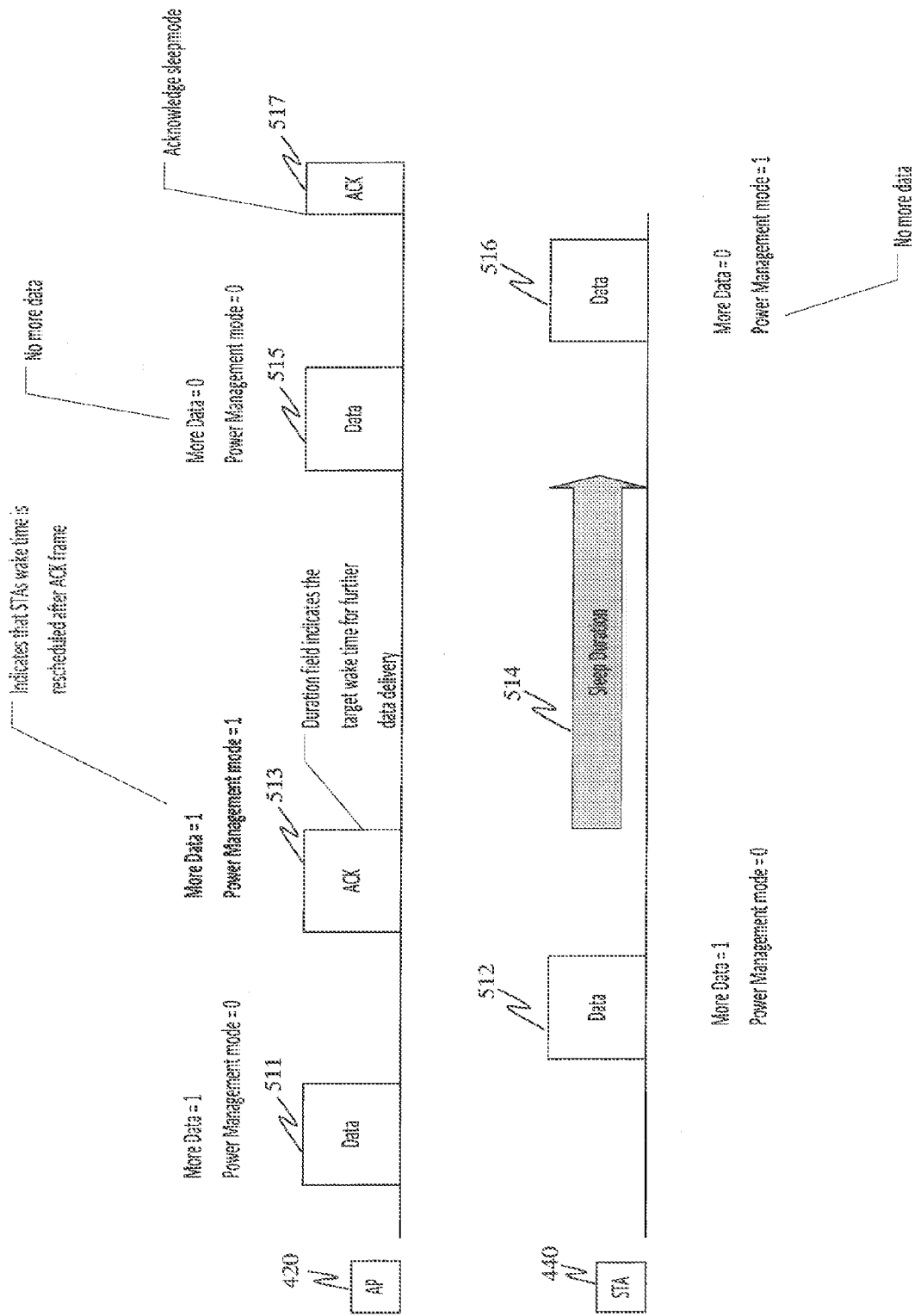

FIG. 5 is a schematic sequence diagram for data frame exchanges in an alternative embodiment.

Figure 6:
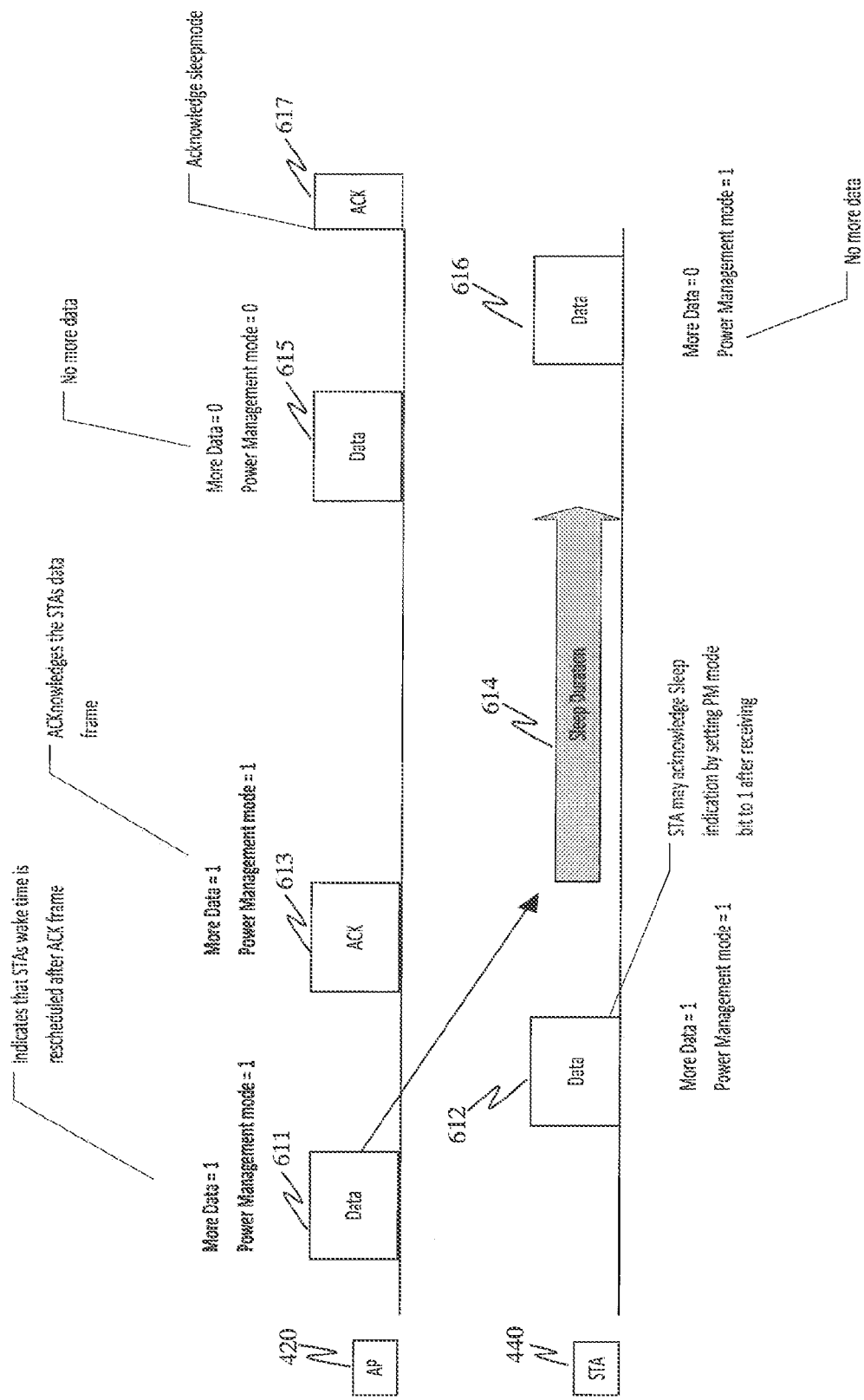

FIG. 6 is a schematic sequence diagram for data frame exchanges in another alternative embodiment.

Figure 7:
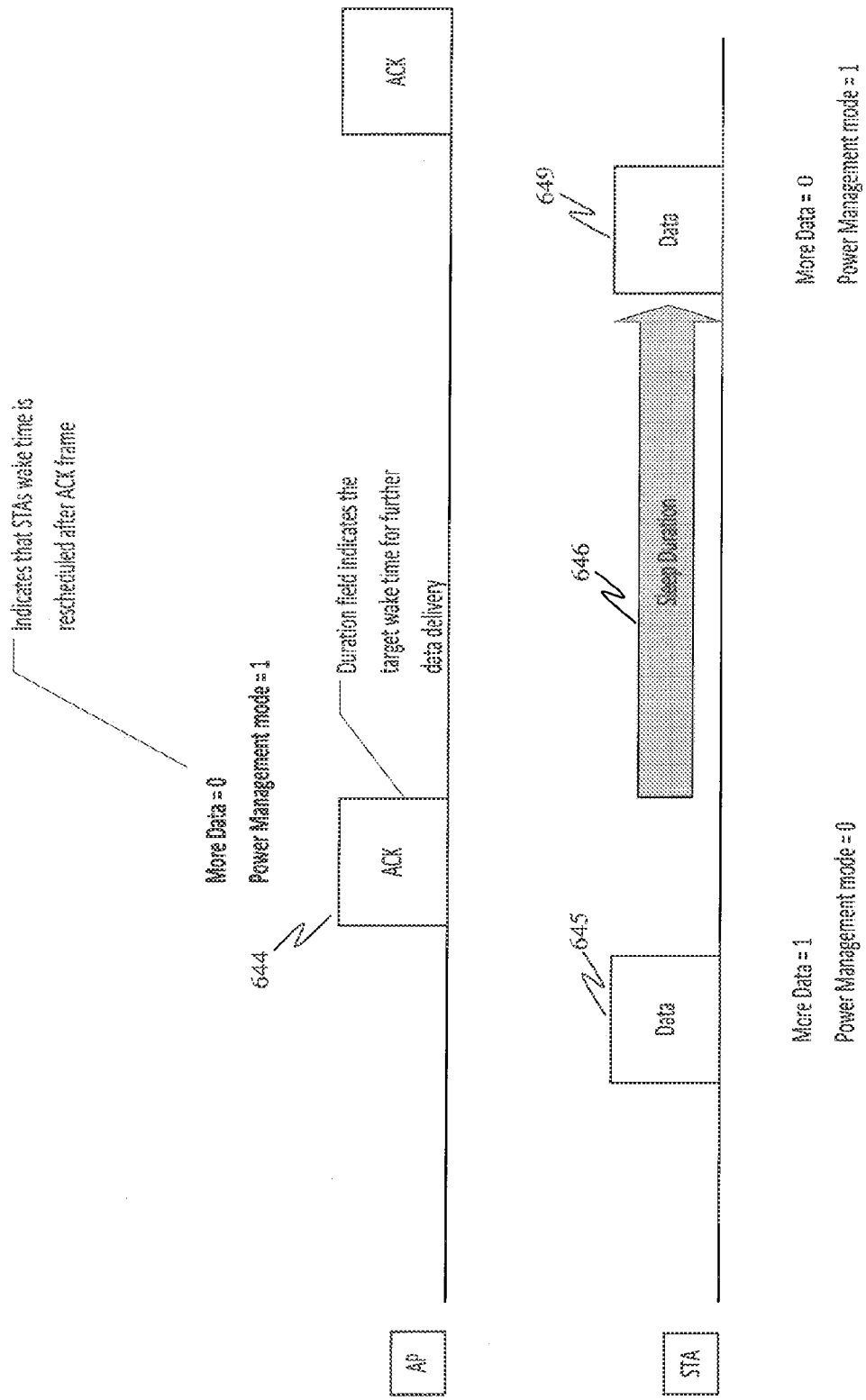

FIG. 7 is a schematic sequence diagram for data frame exchanges in another alternative embodiment.

Figure 8:
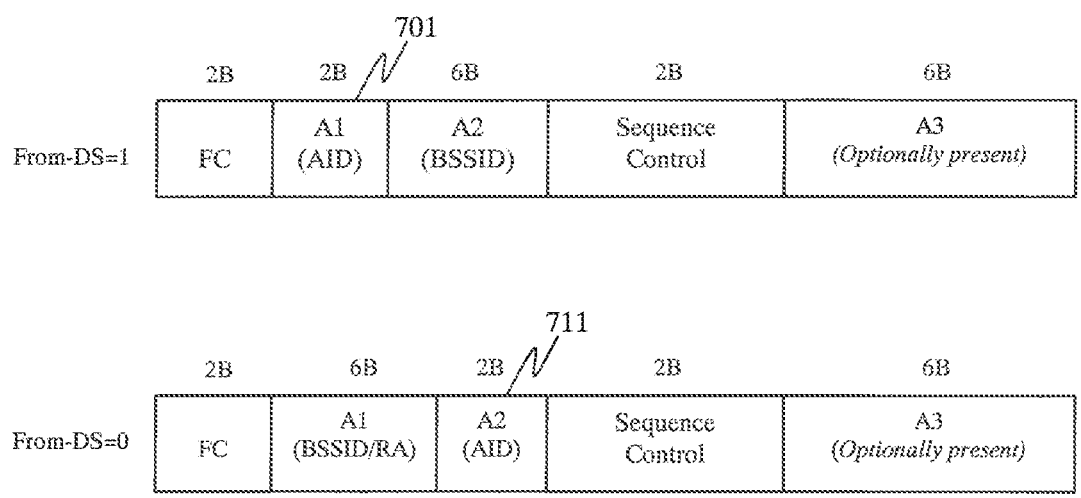

FIG. 8 is a schematic diagram of byte allocations in a short MAC header as embodied wherein the header leads a message to (DS=0) or from the Distribution System (DS=1).

Figure 9:
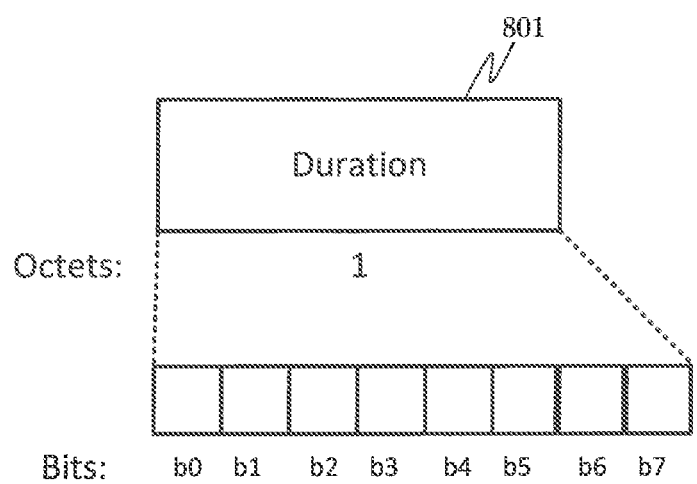

FIG. 9 is a bit allocation diagram of the sleep duration octet(s) in a MAC header.

Figure 10:
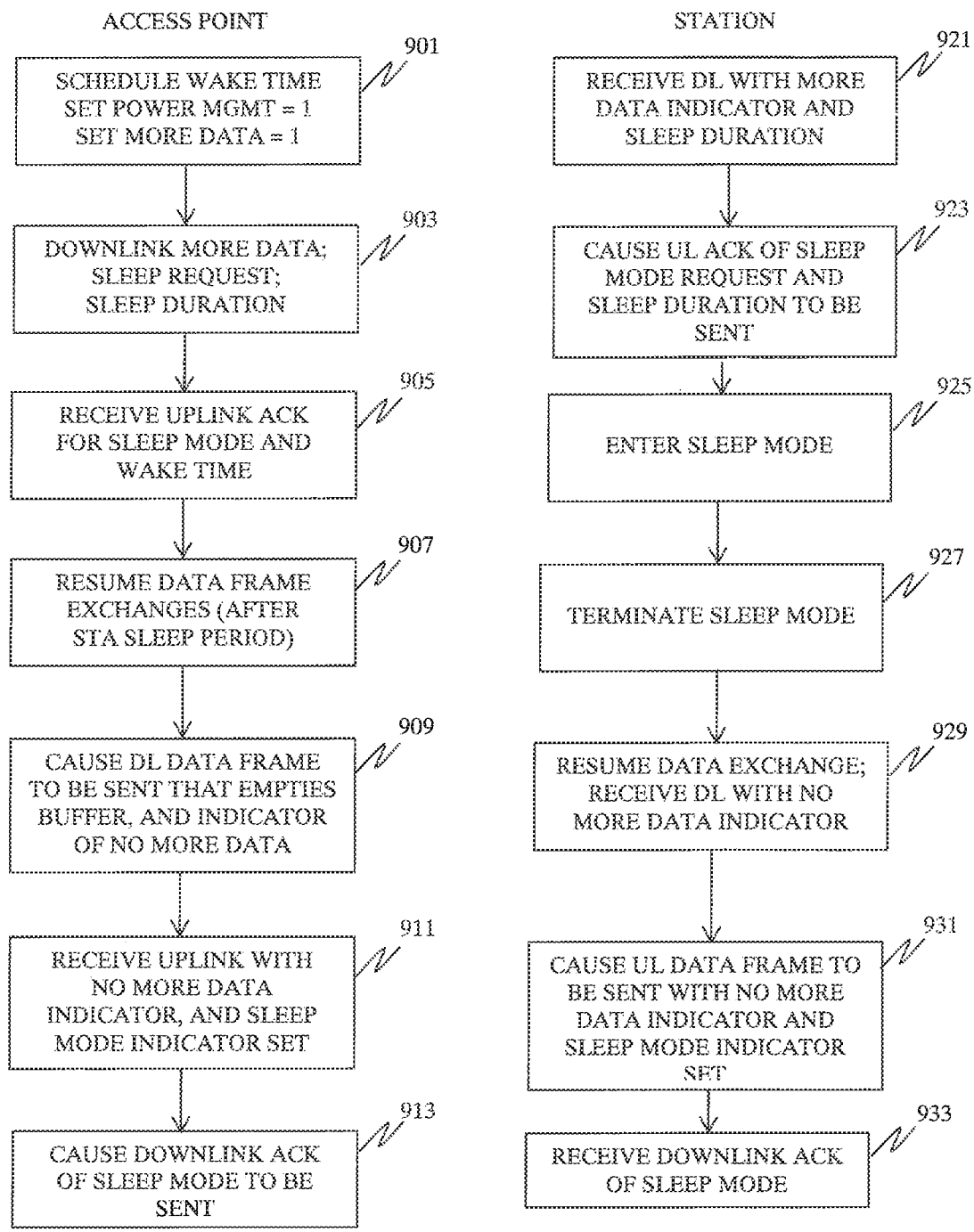

FIG. 10 is a flowchart of a first embodiment of the method for indicating more data to exchange after an interruption in data exchange between AP and a STA.

Figure 11:
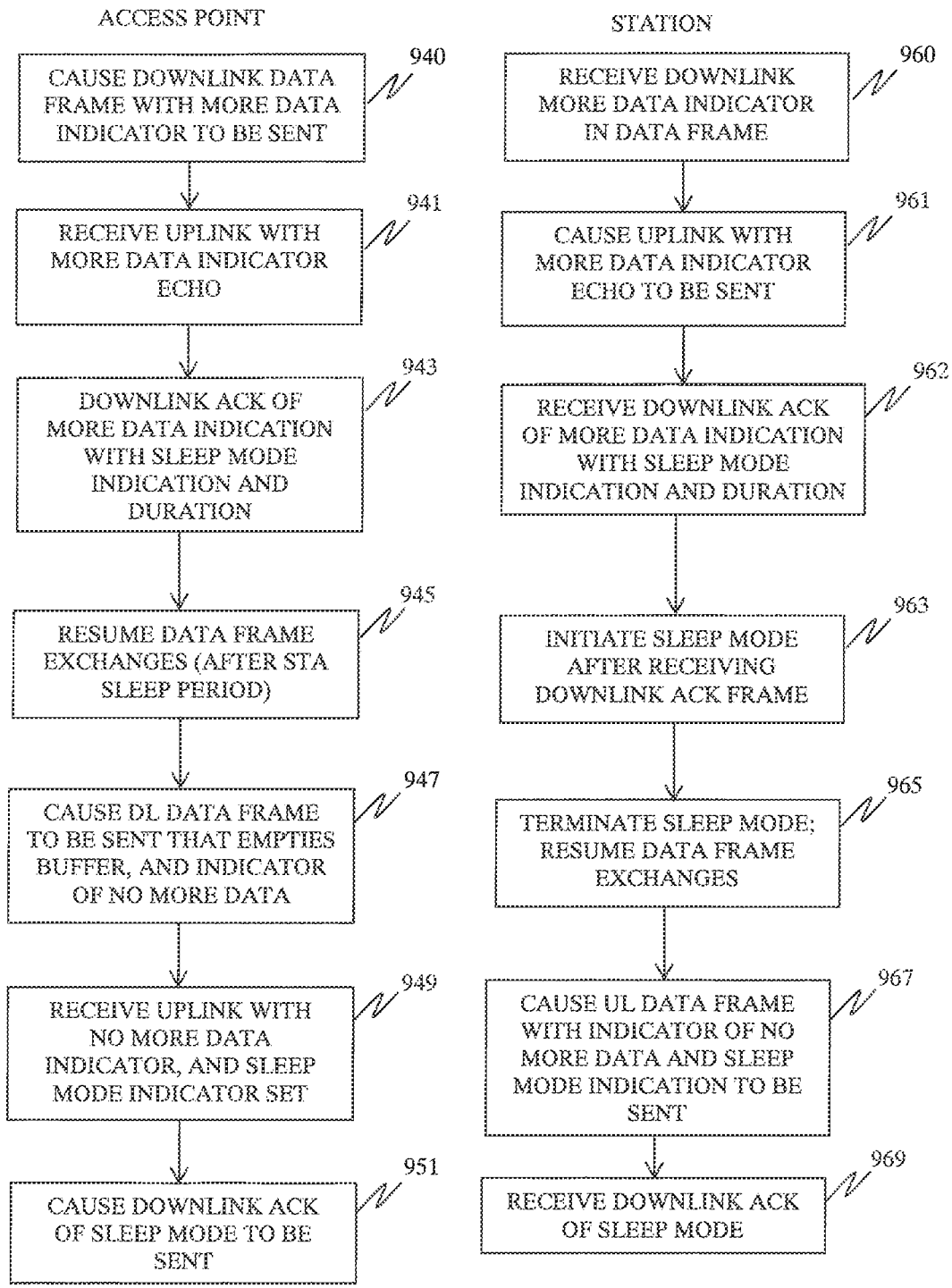

FIG. 11 is an alternative embodiment of the method shown in FIG. 10.

Figure 12:
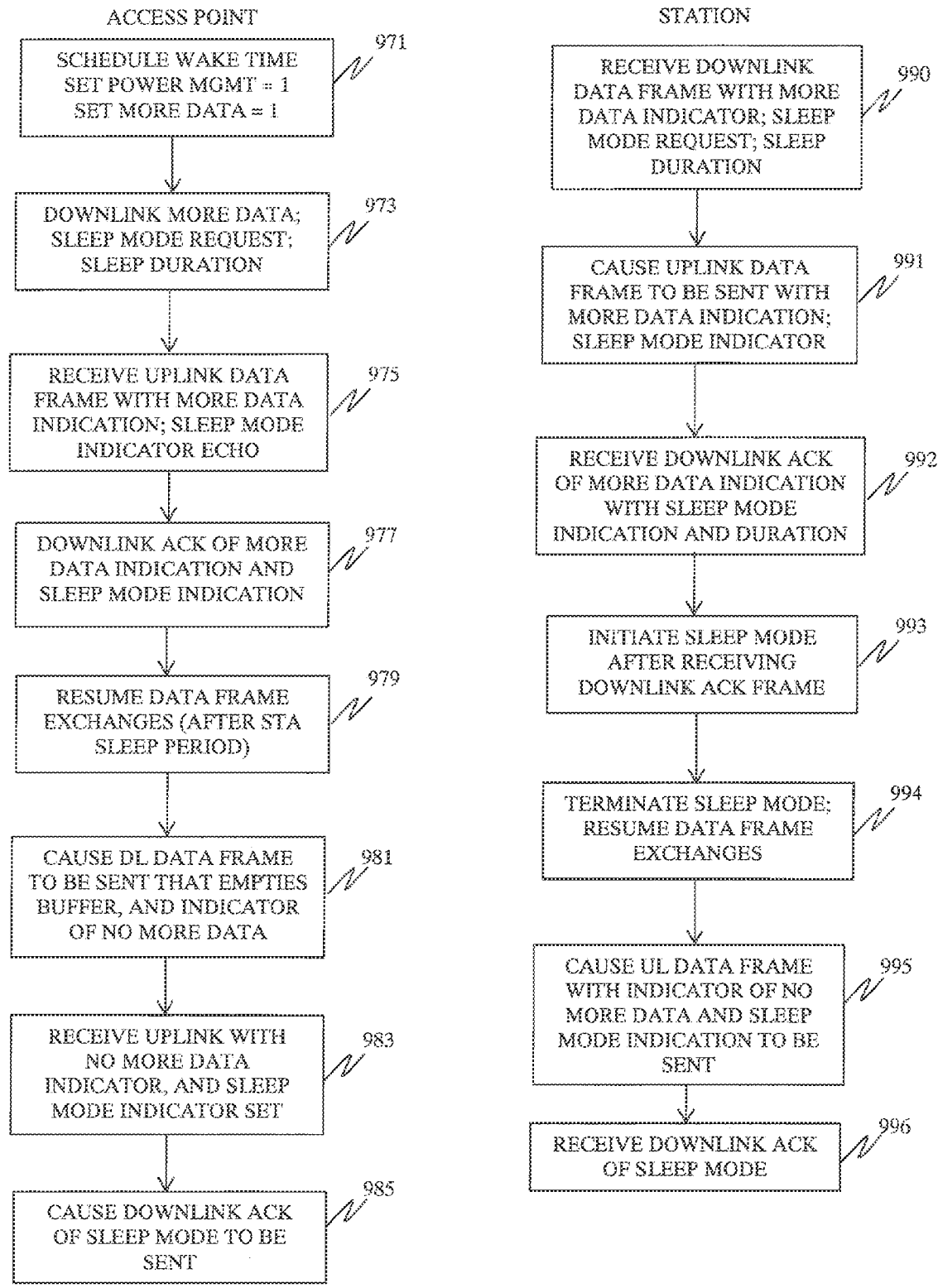

FIG. 12 is a second alternative embodiment of the method shown in FIG. 10.

DETAILED DESCRIPTION

One or more embodiments presently known will be described more fully hereinafter with reference to the accompanying drawings, in which some, but not necessarily all possible embodiments are shown. Indeed, the invention(s) may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Although the method, apparatus and computer program product of example embodiments of the present invention may be implemented in a variety of different systems, one example of such a system is shown in FIG. 1, which includes a mobile terminal 8 that is capable of communication with a network 6 (e.g., a core network) via, for example, an access point 2 (AP). While the network may be configured in accordance with Global System for Mobile communications (GSM)/Enhanced Data rates for Global Evolution (EDGE) Radio Access Network (GERAN), the network may employ other mobile access mechanisms such as a Universal Mobile Telecommunications System (UMTS) Terrestrial Radio Access Network (UTRAN), Long Term Evolution (LTE), LTE-Advanced (LTE-A), wideband code division multiple access (W-CDMA), CDMA2000, and/or the like. The embodiments of the present invention may also be implemented in future LTE based technologies, such as LTE-A and subsequently developed mobile networks.

The network 6 may include a collection of various different nodes, devices or functions that may be in communication with each other via corresponding wired and/or wireless interfaces. For example, the network may include one or more base stations, such as one or more Base Transceiver Stations (BTSs) and Base Station Controllers (BSCs), node Bs, evolved node Bs (eNBs), access points (AP), relay nodes or the like (all of which being hereinafter generically referenced as an access point (AP)), each of which may serve a coverage area divided into one or more cells. For example, the network may include one or more cells, including, for example, the AP 2, each of which may serve a respective coverage area. The serving cell could be, for example, part of one or more cellular or mobile networks or public land mobile networks (PLMNs). In turn, other devices such as processing devices (e.g., personal computers, server computers or the like) may be coupled to the mobile terminal and/or the second communication device via the network.

The mobile terminals (also, "stations" (STAs)) 8 may be in communication with each other or other devices via the network 6. In some cases, each of the mobile terminals may include an antenna or antennas for transmitting signals to and for receiving signals from a base station. In some example embodiments, the mobile terminal 8, also known as a client device, may be a mobile communication device such as, for example, a mobile telephone, portable digital assistant (PDA), pager, laptop computer, tablet computer, or any of numerous other hand held or portable communication devices, computation devices, content generation devices, content consumption devices, universal serial bus (USB) dongles, data cards or combinations thereof. As such, the mobile terminal 8 may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal 8 may also include communication circuitry and corresponding hardware/software to enable communication with other devices and/or the network 6.

Referring now to FIG. 2, an apparatus 20 that may be embodied by or otherwise associated with a mobile terminal 8 (a cellular phone, a personal digital assistant (PDA), smartphone, tablet computer or the like) or an AP 2 may include or otherwise be in communication with a processor 22, a memory device 24, a communication interface 28, and a user interface 30.

In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) including gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

As noted above, the apparatus 20 may, in some embodiments, be embodied by a mobile terminal 8 or an AP 2. However, in some embodiments, the apparatus may be embodied as a chip or chip set. In other words, the apparatus may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 8, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 8) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 28 may be any means such as a device or circuitry embodied in either hardware or a combination of hardware and software that is configured to receive and/or transmit data from/to a network and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a digital super directional array (DSDA) device, the communications interface of one embodiment may include a plurality of cellular radios, such as a plurality of radio front ends and a plurality of base band chains. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal 8, the apparatus may include a user interface 30 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may include user interface circuitry configured to control at least some functions of one or more user interface elements such as, for example, a speaker, ringer, microphone, display, and/or the like. The processor and/or user interface circuitry including the processor may be configured to control one or more functions of one or more user interface elements through computer program instructions (e.g., software and/or firmware) stored on a memory accessible to the processor (e.g., memory device and/or the like).

Addressing a solution to the buffered data problem, it arises when an AP indicates to the STA that it has more data in the buffer for downlink but decides to downlink the remaining frames later. Referring to FIGS. 3a and 3b, there is shown an illustration of the data frame 301 (FIG. 3a) and the Frame Control bytes (FIG. 3b) that are the first two octets in the medium access control (MAC) header of the data frame 301. Each data frame 301 includes a MAC header and concludes with a frame body 302 of potentially several thousand octets of data. The MAC header is led by two octets (16 bits) of frame control 304 information. Referring to FIG. 3b, the information that is most relevant to the present embodiments are the Frame Control bits that signal to the STA the Power Management 308 mode and the More Data 306 indicator from the AP. Referring to FIG. 3a, also relevant is the Duration 311 segment of the MAC header, which indicates how long a STA sleep period is to extend when the AP sends to a STA the indication in the Power Management 308 bit of the Frame Control 304 block that the STA should enter a sleep period.

Referring to FIG. 4, in a first embodiment AP signals that it has more data to send in a future data frame and schedules new target wake time for STA in the DATA frame. The illustration shows a sequence of data frame exchanges between the AP 420 and a STA 440. The first data frame 401 includes the More Data indicator bit (set to "1" to indicate more data will remain after this frame is complete) and the Power Management mode indicator (set to "0" to indicate active mode). The STA 440 responds with a data frame 402 containing a More Data indicator set to "1" to show that it received the More Data indicator from the AP 420, and a Power Management bit set to "0" to show that it (the STA) remains in active mode as commanded.

The next data frame 403 from the AP also indicates More Data ("1") to send after this frame. However, AP has determined that this data will be sent later. This may occur because it is necessary for AP to transmit a beacon or it has other management tasks to perform or serve another STA. Thus, AP includes a Power Management bit set to "1" in the frame control segment, which informs the STA that the STA is to enter Sleep mode at the end of this data frame 403. As indicated in FIG. 4, along with the Sleep mode indicator, the Duration field of the MAC header (FIG. 3, reference 311) contains the target wake time for the STA. In this embodiment, the STA sends an acknowledgement signal 404 to indicate that it has received the Sleep mode request and the target wake time information. The STA then enters Sleep mode 405 for the duration signaled by the AP 420. If STA does not ACK the sleep duration (by setting the Power Save Mode bit in the ACK 404) AP shall not try to transmit the remaining data frames after the sleep duration.

Other STAs receiving (overhearing) the data frame with 'duration' field set to a specific value (other than zero) interpret this field as a target wake time for the receiving STA and do not interpret it as a 'duration' to set the Network Allocation Vector (NAV) during which the STA will not contend for access to the channel. When the duration field indicates target wake time in the DATA frame, an overhearing STA can assume that an ACK may follow this transmission and the channel would be available for contention after the ACK.

Because the AP provided the STA with the target wake time, the AP also knows when the STA will wake and be prepared to receive the remaining data. At the conclusion of the sleep period 405 set by the AP 420, it sends another data frame 406 to the STA 440. This data frame 406 includes a More Data indicator set to "0" to inform the STA that there is no more data to be sent after this frame. The AP has the Power Management indicator set to "0" indicating that it expects the STA to be in active mode for this data exchange. The STA 440 responds with a data frame 407 that includes a More Data indicator set to "0" to indicate that there is no more data to exchange. The frame 407 also includes a Power Management indicator bit set to "1" to inform the AP that the STA intends to return to Sleep mode. In this embodiment, the AP acknowledges 408 the change in Power Management (Sleep) mode.

Referring to FIGS. 5 and 6, there are shown two alternative scenarios for the sleep duration indication. In each, the STA 440 does not send an ACK frame 404 (FIG. 4) as it did in the above scenario. In these alternative scenarios the AP 420 sends sleep mode duration information in different frames.

In the FIG. 5 scheme, the protocol is much like that of the FIG. 4 scheme, but without the ACK frame from the STA 440. In data frame exchanges 511, 512 the More Data bit is set on both sides to signal that there is more data to exchange. The Power Management (PM) bit is set to "0" for the active state. In the AP data frame 513, the More Data bit remains set to "1" to show more data pending. But the PM bit changes to "1" to request Sleep mode for the STA 440 and the Duration field in the MAC header frame contains the target wake time for the STA after Sleep. This time, the STA is silent—no ACK is uplinked—and the STA 440 enters Sleep mode 514. Coming out of Sleep mode, all is as it was in the previous scenario. When the data is complete, the AP data frame 515 shows More Data="0" and the PM mode is set to "0" for active state. The STA frame 516 changes More Data to "0" too, and changes the PM bit to "1" to show that it is again entering Sleep mode (now that the data is finished). The AP 420 acknowledges 517 the Sleep mode indication.

In the FIG. 6 scenario there is another change. The AP 420 data frame 611 indicates more data ("1") but also indicates that Sleep Mode is requested (PM="1"), including the new wake time information in that frame 611 (the next to last AP frame this time). The STA data frame 612 acknowledges the Sleep request by changing its PM bit to "1." However, before entering Sleep mode the STA 440 waits for and receives an Acknowledgement 613 frame from the AP 420 in which the AP indicates More Data remaining to downlink (later) and signaling awareness that the STA is entering Sleep mode with PM="1." The after-Sleep sequence remains the same.

It should be noted that in all cases above (FIGS. 4, 5, 6) the uplink DATA transmission from the STA further indicates acknowledgement of the preceding downlink DATA frame from the AP. Alternatively, a separate ACK from the STA may acknowledge the DATA packet prior to sending an uplink DATA frame to the AP.

In one additional scenario shown in FIG. 7, where AP 644 has no more DL data in the buffer but is receiving UL data from the STA 645, the AP 644 may indicate in the ACK message that STA 645 shall continue the frame exchange after the target wake time by setting the power management bit (PM=1) and setting the ACK duration value to be non-zero. This indicates that STA should discontinue UL transmission and continue after the timer value in the duration field has expired. STA enters sleep mode 646. Other STAs overhearing the frame check the value PM=1 and interpret the duration value to be target wake time and thus shall not set the NAV. (Note: In case the PM=0, the overhearing STAs would interpret the duration value as a transmission duration for the upcoming frames after the ACK.) After the STA terminates sleep mode, it resumes uplink of buffered data 649 until the data is exhausted (More Data=0). The uplink carries a sleep mode indicator (PM=1) telling the AP that the STA is returning to sleep mode.

In one additional scenario if AP set the PM=1 and MD=1 but sets the duration field to be ZERO (=0) it could indicate that AP will transmit the DL buffered data in the TIM mode. In TIM mode the AP indicates in the beacon that which STAs it serves during the TIM period (period can be e.g. a beacon or multiple beacons). A STA may indicate with PM=1 and MD=1 and the duration field set to ZERO that it requests that the it can enter sleep mode even though it has DATA in the buffer. AP may choose to set this STA to TIM mode which means that STAs UL data delivery will be scheduled by AP. Such scheduling, in both cases could be made by controlling the target wake time of the STA.

These transactions can occur between two non ap-STAs or a STA may request later delivery from AP with the same mechanism. In case a STA requests later delivery or indicates that it will continue uplink (UL) DATA frame delivery later, AP may or may not acknowledge the request.

The embodiments described above may use the so-called normal ACK (also Block-ACK) which is currently specified in the 802.11-2012 version of the wireless specification. In case a short ACK is used, the STA and AP may indicate the "Power Save Mode" and "More Data" in the signal field of the ACK (by using the reserved bits or other fields that are agreed between AP and STA).

Alternatively or additionally other type of frames can be used to schedule target wake time periods by setting the combination of More Data and Power Save Mode bits in the frame control. Such messages could be e.g. RTS/CTS (Ready-to-Send/Clear-to-Send), CF-end (Contention Free end), CF-end+ACK (Contention Free end+Acknowledgement) or PS-poll (Power Save-poll. In some cases NDP (non-data packet) frames are suitable for indicating or acknowledging the scheduled target wake time.

Short MAC Header and Duration

In some cases a short MAC Header Format as shown in FIG. 8 may be used. In one implementation option, the Association Identifier 701, 711 (AID) (A1 in upper frame and A2 in the lower frame) is replaced with "Sleep Duration" indication. An example Duration field is shown in FIG. 9.

In one example the bit values b0-b7 may indicate the sleeping duration in
  number of symbols
  number of beacon intervals
  number of short beacon intervals
  duration in ms (milliseconds)
Alternatively or additionally, N MSB bits (Most Significant Bit) may indicate a scaling value for the remaining bits that indicate the sleeping duration value.
  example scaling values could be (with 2 MSB bits):
    00—factor of 1
    01—factor of 10
    10—factor of 100
    11—factor of 1000
  The remaining 6 bits would indicate the duration value
In an additional example embodiment the scaling bits could indicate the TU (time unit) that is used for the sleep duration. For example:
  00—milliseconds
  01—tenths (sec)
  10—seconds
  11—minutes
In case the Duration is indicated with more than one byte (e.g., the AID field 701, 711 in the short MAC header allocates two (2) octets), the above examples apply:
  N MSB bits for scaling, remaining bits for the duration value.
A person skilled in art could understand that also other combinations of frame control or PLCP header SIG field bits could indicate the target wake time and interpretation of duration field.

The embodiments described herein enable an AP to reschedule the delivery of further data frames when other needs/duties intrude upon data exchanges with STAs. AP is able to balance the DATA exchange between multiple STAs rather than address the STAs in a sequential queue where the last STA in the queue might not be handled for unacceptably long periods. STAs could be fairly addressed and serviced using these methods.

Reference to FIGS. 10-12 provides illustrations of the described methods. FIG. 10 shows the actions of both the AP and the STA in a first embodiment. The apparatus 20 embodied by the AP may include means, such as the processor 22, for scheduling a wake time for the STA 901 and, for the last data frame of a sequence, sets the MORE DATA indicator and the SLEEP MODE (Power Management bit) indicator. Then apparatus 20 embodied by the AP may also include means, such as the processor 22, the communications interface 28 or the like, for causing the data frame 903 having the MORE DATA and SLEEP MODE indicators to be downlinked along with the sleep duration that sets the STA target wake time. The apparatus 20 embodied by the STA may include means, such as the processor 22, the communications interface 28 or the like, for receiving that downlink 921 and for causing an uplink acknowledgement (ACK) 923 of the sleep mode request and sleep duration to be sent. The apparatus 20 embodied by the AP may include means, such as the processor 22, the communications interface 28 or the like, for receiving the uplink ACK 905 while the apparatus 20 embodied by the STA includes means, such as the processor 22, for entering sleep mode 925. Once the wake time arrives the apparatus 20 embodied by the STA may include means, such as the processor 22, for terminating sleep mode 927 and the apparatus 20 embodied by the AP may include means, such as the processor 22, the communications interface 28 or the like, for resuming data frame downlink 907. At some point in the data frame exchanges the apparatus 20 embodied by the AP may include means, such as the processor 22, the communications interface 28 or the like, for causing a downlink data frame to be sent that exhausts the data buffer 909 and includes an indicator that there is no more data. The apparatus 20 embodied by the STA may include means, such as the processor 22, the communications interface 28 or the like, for receiving that downlink 929 and for causing an uplink 931 to be sent echoing the no more date indication and including a sleep mode indication. The apparatus 20 embodied by the AP may include means, such as the processor 22, the communications interface 28 or the like, for causing an ACK to be downlinked indicating that the STA is entering sleep mode 913 and the apparatus 20 embodied by the STA may correspondingly include means, such as the processor 22, the communications interface 28 or the like, for receiving that ACK 933 and entering sleep mode.

FIG. 11 depicts an alternative sequence. The difference in this method is that the STA does not send an ACK of sleep mode; instead the apparatus 20 embodied by the AP may include means, such as the processor 22, the communications interface 28 or the like, for causing the downlink of an ACK of the STA's receipt of the MORE DATA indicator 943, which includes the sleep mode indicator and sleep duration data. In this embodiment, the apparatus 20 embodied by the AP may include means, such as the processor 22, the communications interface 28 or the like, for including in its last downlink data frame 940 a MORE DATA indicator. The apparatus 20 embodied by the STA may correspondingly include means, such as the processor 22, the communications interface 28 or the like, for, receiving the downlink data frame including the MORE DATA indicator 960 at the STA. The apparatus 20 embodied by the STA may include means, such as the processor 22, the communications interface 28 or the like, for causing the uplink of an echo 961 of the MORE DATA indicator. As such, the apparatus 20 embodied by the AP may include means, such as the processor 22, the communications interface 28 or the like, for receiving at 941 the uplink. At that point the apparatus 20 embodied by the AP may include means, such as the processor 22, the communications interface 28 or the like, for causing an ACK 943 of the MORE DATA echo to be downlinked together with the SLEEP MODE indicator (PM=1) and sleep duration to set the target wake time. The apparatus 20 embodied by the STA may include means, such as the processor 22, the communications interface 28 or the like, for receiving the downlink ACK 962 and for initiating sleep mode 963. Once the duration of sleep mode has run out, the apparatus 20 embodied by the STA may include means, such as the processor 22, for terminating sleep mode 965. Data frame exchanges may resume and conclude in the same manner as described above. At some point in the data frame exchanges the apparatus 20 embodied by the AP may include means, such as the processor 22, the communications interface 28 or the like, for causing a downlink data frame to be sent that exhausts the data buffer 947 and includes an indicator that there is no more data. The apparatus 20 embodied by the STA may include means, such as the processor 22, the communications interface 28 or the like, for receiving that downlink and for causing an uplink 967 to be sent echoing the no more date indication and including a sleep mode indication. The apparatus 20 embodied by the AP may include means, such as the processor 22, the communications interface 28 or the like, for causing an ACK to be downlinked that the STA is entering sleep mode 951 and the apparatus 20 embodied by the STA may include means, such as the processor 22, the communications interface 28 or the like, for receiving that ACK 969 and entering sleep mode.

Referring to FIG. 12, another alternative process is illustrated. The apparatus 20 embodied by the AP may include means, such as the processor 22, for setting a wake time 971 and setting the MORE DATA indicator and SLEEP MODE indicators. Then, in the last data frame exchange before interruption the apparatus 20 embodied by the AP may include means, such as the processor 22, the communications interface 28 or the like, for causing the downlinking 973 of the more data indicator, sleep mode indicator and the sleep duration data. The apparatus 20 embodied by the STA may include means, such as the processor 22, the communications interface 28 or the like, for receiving that data frame 990 and for causing an uplink of its last data frame to be sent in which STA echoes 991 the more data and sleep mode indications. The apparatus 20 embodied by the AP may include means, such as the processor 22, the communications interface 28 or the like, for receiving that uplink 975 and for responding with a downlink 977 ACK of the sleep mode, continuing the indicator of more data for future exchange. The apparatus 20 embodied by the STA may include means, such as the processor 22 or the like, for initiating sleep mode 993 after receiving the downlink ACK from AP. Once the sleep duration expires, the apparatus 20 embodied by the STA may include means, such as the processor 22 or the like, for terminating sleep mode 994 and data frame exchange resumes from the AP 979. When the data buffer is empty the apparatus 20 embodied by the AP may include means, such as the processor 22, the communications interface 28 or the like, for causing a downlink data frame to be sent including an indicator of no more data 981. The apparatus 20 embodied by the STA may include means, such as the processor 22, the communications interface 28 or the like, for responding with an uplink data frame 995 echoing the no more data indication and including an indicator of intent to enter sleep mode. The apparatus 20 embodied by the AP may include means, such as the processor 22, the communications interface 28 or the like, for receiving that uplink 983 and for responding with a downlink ACK 985 of sleep mode. The apparatus 20 embodied by the STA may include means, such as the processor 22, the communications interface 28 or the like, for receiving the ACK 996 and entering sleep mode.

As described above, FIGS. 10-12 are flowcharts of a method, system, and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks. These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 10-12, when executed, convert a computer or processing circuitry into a particular machine configured to perform an example embodiment of the present invention. Accordingly, the operations of FIGS. 10-12 define an algorithm for configuring a computer or processing circuitry (e.g., processor) to perform an example embodiment. In some cases, a general purpose computer may be configured to perform the functions shown in FIGS. 10-12 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The following acronyms and abbreviations appear in the above Specification and may appear in the claims that follow:

ACK Acknowledgement
AID Association Identifier

AP Access Point
BSSID Basic Service Set identifier
RTS Ready-to-Send
CF-end Contention Free end
CF-end+ACK Contention Free end+Acknowledgement
CTS Clear-to-Send
DCF Distributed Coordination Function
DL Downlink
DS Distributed System
FC Frame Control
LTE Long Term Evolution
LTE-A Long Term Evolution-Advanced
MAC Medium Access Control
MD More Data
PM Power Management
PS-poll Power Save-poll
RA Receiver Address
STA Station
TIM Traffic Indicator Map
UL Uplink

What is claimed:

1. A method comprising:
causing to be sent by downlink transmission of a first data frame comprising data and a header from an access point to a first station in a cellular network, an indication that additional data remains buffered for delivery after an interruption in data frame exchanges, wherein the indication is included in the header of the first data frame;
scheduling a target wake time for the first station, at which to resume delivery of data frames to the first station via the cellular network;
causing a sleep mode indication and sleep duration to be sent in the header of the first data frame to set the target wake time to resume the delivery of data frames to the first station;
resuming sending the data frames at the target wake time if an uplink signal acknowledgement of the sleep mode indication and sleep duration from the first station is received by the access point; and
foregoing sending the data frames at the target wake time in the absence of an uplink signal acknowledgement of the sleep mode indication and sleep duration from the first station.

2. The method of claim 1 further comprising at least one of:
causing a downlink signal data frame to be sent that causes buffered data to be emptied, including an indicator that no data remains to send;
receiving a data frame uplink with an indicator of no more data and a sleep mode indicator.

3. A method comprising:
receiving by downlink transmission of a first data frame comprising data and a header from an access point to a first station in a cellular network, an indication that additional data remains buffered for delivery after an interruption in data frame exchanges, wherein the indication is included in the header of the first data frame;
receiving a sleep mode indication and sleep duration in the header of the first data frame to set a target wake time to resume the delivery of data frames to the first station;
causing to resume the delivery of the data frames at the target wake time if an uplink signal acknowledgement of the sleep mode indication and sleep duration from the first station is sent to the access point; and
causing to forego the delivery of the data frames at the target wake time in the absence of an uplink signal acknowledgement of the sleep mode indication and sleep duration from the first station.

4. The method of claim 3, further comprising at least one of:
causing an uplink signal acknowledgement of the sleep mode indication and sleep duration to be sent; and
causing to be sent in a final uplink data frame before interruption of data exchanges an indication that data is buffered for reception after the interruption and that a sleep mode request has been received.

5. The method of claim 4, further comprising at least one of:
a) initiating sleep mode after sending the uplink acknowledgement;
b) initiating sleep mode after receiving the acknowledgement frame downlink signal;
c) terminating sleep mode;
receiving data frame exchange(s); and
receiving a downlink data frame having an indicator of no more data; and
d) causing to be sent an uplink data frame with a no more data indicator and the sleep mode indicator set.

6. An apparatus comprising at least a processor, a memory in operative communication with the processor and having computer coded instructions stored therein, said instructions when executed by the processor causing the apparatus to perform:
causing to be sent by downlink transmission of a first data frame comprising data and a header from an access point to a first station in a cellular network, an indication that additional data remains buffered for delivery after an interruption in data frame exchanges, wherein the indication is included in the header of the first data frame;
scheduling a target wake time for the first station, at which to resume delivery of data frames to the first station via the cellular network;
causing a sleep mode indication and sleep duration to be sent in the header of the first data frame to set the target wake time to resume the delivery of data frames to the first station;
resuming sending the data frames at the target wake time if an uplink signal acknowledgement of the sleep mode indication and sleep duration from the first station is received by the access point, and
foregoing sending the data frames at the target wake time in the absence of an uplink signal acknowledgement of the sleep mode indication and sleep duration from the first station.

7. The apparatus of claim 6, further comprising instructions causing the apparatus to perform at least one of:
causing a downlink signal data frame to be sent that causes buffered data to be emptied, including an indicator that no data remains to send;
receiving a data frame uplink with an indicator of no more data and a sleep mode indicator; and
causing a downlink acknowledgement of sleep mode to be sent.

8. An apparatus comprising at least a processor, a memory in operative communication with the processor and having computer coded instructions stored therein, said instructions when executed by the processor causing the apparatus to perform;
receiving by downlink transmission of a first data frame comprising data and a header from an access point to a first station in a cellular network, an indication that additional data remains buffered for delivery after an interruption in data frame exchanges, wherein the indication is included in the header of the first data frame;

receiving a sleep mode indication and sleep duration in the header of the first data frame to set a target wake time to resume the delivery of data frames to the first station causing to resume the delivery of the data frames at the target wake time if an uplink signal acknowledgement of the sleep mode indication and sleep duration from the first station is sent to the access point; and causing to forego the delivery of the data frames at the target wake time in the absence of an uplink signal acknowledgement of the sleep mode indication and sleep duration from the first station.

9. The apparatus of claim 8, further comprising instructions causing the apparatus to perform at least one of:

causing to be sent an uplink signal acknowledgement of the sleep mode indication and sleep duration; and causing to be sent in a final uplink data frame before interruption of data exchanges an indication that data is buffered for reception after the interruption and that a sleep mode request has been received.

10. The apparatus of claim 9, further comprising at least one of instructions causing the apparatus to perform:

a) initiating sleep mode after sending the uplink acknowledgement;

b) initiating sleep mode after receiving the acknowledgement frame downlink signal;

c) terminating sleep mode;
   receiving data frame exchange(s); and
   receiving a downlink data frame having an indicator of no more data; and causing an uplink data frame to be sent with a no more data indicator and the sleep mode indicator set.

11. A computer program product comprising a non-transitory computer readable medium having computer coded instructions stored therein, said instructions when executed by a processor causing an apparatus to perform:

causing to be sent by downlink transmission of a first data frame comprising data and a header from an access point to a first station in a cellular network, an indication that additional data remains buffered for delivery after an interruption in data frame exchanges, wherein the indication is included in the header of the first data frame;

scheduling a target wake time for the first station, at which to resume delivery of data frames to the first station via the cellular network;

causing a sleep mode indication and sleep duration to be sent in the header of the first data frame to set the target wake time to resume the delivery of data frames to the first station;

resuming sending the data frames at the target wake time if an uplink signal acknowledgement of the sleep mode indication and sleep duration from the first station is received by the access point, and foregoing sending the data frames at the target wake time in the absence of an uplink signal acknowledgement of the sleep mode indication and sleep duration from the first station.

12. The computer program product of claim 11, further comprising instructions causing the apparatus to perform at least one of:

causing a downlink signal data frame to be sent that causes buffered data to be sent, including an indicator that no data remains to send;

receiving a data frame uplink with an indicator of no more data and a sleep mode indicator; and causing a downlink acknowledgement of sleep mode to be sent.

13. A computer program product comprising a non-transitory computer readable medium having computer coded instructions stored therein, said instructions when executed by a processor causing an apparatus to perform:

receiving by downlink transmission of a first data frame comprising data and a header from an access point to a first station in a cellular network, an indication that additional data remains buffered for delivery after an interruption in data frame exchanges, wherein the indication is included in the header of the first data frame;

receiving a sleep mode indication and sleep duration in the header of the first data frame to set a target wake time to resume the delivery of data frames to the first station;

causing to resume the delivery of the data frames at the target wake time if an uplink signal acknowledgement of the sleep mode indication and sleep duration from the first station is sent to the access point; and causing to forego the delivery of the data frames at the target wake time in the absence of an uplink signal acknowledgement of the sleep mode indication and sleep duration from the first station.

14. The computer program product of claim 13, further comprising instructions causing the apparatus to perform at least one of:

causing an uplink signal acknowledgement to be sent of the sleep mode indication and sleep duration; and causing to be sent in a final uplink data frame before interruption of data exchanges an indication that data is buffered for reception after the interruption and that a sleep mode request has been received.

15. The computer program product of claim 14, further comprising instructions causing the apparatus to perform at least one of:

a) initiating sleep mode after sending the uplink acknowledgement;

b) initiating sleep mode after receiving the acknowledgement frame downlink signal;

c) terminating sleep mode;
   receiving data frame exchange(s); and
   receiving a downlink data frame having an indicator of no more data; and d) causing an uplink data frame to be sent with a no more data indicator and the sleep mode indicator set.

16. A method comprising:

causing an uplink transmission of a first data frame comprising data and a header from a first station to an access point in a cellular network to be sent with an indication included in the header of the first data frame that more data remains buffered for uplink;

receiving a downlink transmission of a second data frame from the first station to the access point in the cellular network, the second data frame comprising data and a header, the header of the second data frame including an indication that there is no more data ready for downlink;

receiving in the downlink transmission a sleep mode indicator and a duration for sleep mode in the header of the second data frame;

causing to resume delivery of data frames at the target wake time if an uplink signal acknowledgement of the sleep mode indication and sleep duration from the first station is sent to the access point; and causing to forego delivery of data frames at the target wake time in the absence of an uplink signal acknowledgement of the sleep mode indication and sleep duration from the first station.

17. The method of claim 16 further comprising at least one of:

a) initiating sleep mode for the duration period received in the downlink signal; and
b) terminating sleep mode;
resuming data frame uplink exchange until the data buffer is emptied; and
upon emptying the data buffer uplinking a sleep mode indicator.

* * * * *